United States Patent
Ito et al.

(10) Patent No.: US 7,354,643 B2
(45) Date of Patent: Apr. 8, 2008

(54) THREE-DIMENSIONAL OBJECT AND METHOD OF PRODUCING THE SAME

(75) Inventors: Takashi Ito, Kanagawa (JP); Tsuneo Hagiwara, Kanagawa (JP)

(73) Assignee: CMET Inc., Kanagawa (JP)

( * ) Notice: Subject to any disclaimer, the term of this patent is extended or adjusted under 35 U.S.C. 154(b) by 1 day.

(21) Appl. No.: 10/561,673

(22) PCT Filed: Jun. 23, 2004

(86) PCT No.: PCT/JP2004/009216

§ 371 (c)(1),
(2), (4) Date: Dec. 21, 2005

(87) PCT Pub. No.: WO2004/113056

PCT Pub. Date: Dec. 29, 2004

(65) Prior Publication Data

US 2006/0141276 A1 Jun. 29, 2006

(30) Foreign Application Priority Data

Jun. 24, 2003 (JP) .............................. 2003-179034

(51) Int. Cl.
*B32B 7/02* (2006.01)
*B32B 5/16* (2006.01)
*B05D 1/36* (2006.01)
*B05D 3/02* (2006.01)

(52) U.S. Cl. ...................... 428/327; 428/212; 428/332; 427/372.2; 427/402; 427/407.1

(58) Field of Classification Search ..................... None
See application file for complete search history.

(56) References Cited

U.S. PATENT DOCUMENTS

2003/0059708 A1 * 3/2003 Yamamura et al. ......... 430/269

FOREIGN PATENT DOCUMENTS

| JP | 56-144478 A | 11/1981 |
|---|---|---|
| JP | 60-247515 A | 12/1985 |
| JP | 62-35966 A | 2/1987 |
| JP | 02-113925 A | 4/1990 |
| JP | 02-153722 A | 6/1990 |
| JP | 03-41126 A | 2/1991 |
| JP | 07-26060 A | 1/1995 |
| JP | 07-102175 A | 4/1995 |
| JP | 07-103218 A | 11/1995 |
| JP | 11-310626 A | 11/1999 |
| JP | 2002-060463 A | 2/2002 |
| JP | 2002-509982 A | 4/2002 |
| JP | 2002-510748 A | 4/2002 |
| JP | 2003-073457 A | 3/2003 |

* cited by examiner

*Primary Examiner*—Sheeba Ahmed
(74) *Attorney, Agent, or Firm*—Panitch Schwarze Belisario & Nadel LLP

(57) ABSTRACT

It is intended to provide an optical three-dimensional object as will be described below which has a high impact resistance and is superior in dimensional accuracy, mechanical properties such as tensile strength, and other properties such as water resistance, moisture resistance and heat resistance, and a method of producing the same. An optical three-dimensional object includes multiple cured resin layers containing at least one cured resin layer that has a sea-island microstructure in which fine island components of a polymer differing from a cured resin constituting the sea component and have a particle diameter of 20 to 2,000 nm are dispersed in the sea component made of the cured polymer; and a method of producing this optical three-dimensional object by stereolithographic molding method with the use of a photo curable resin composition containing a homogeneous mixture of a curable resin component for forming the sea component with a component (preferably a polyalkylene ether compound) for forming the polymeric island components.

17 Claims, 3 Drawing Sheets

THREE-DIMENSIONAL OBJECT AND METHOD OF PRODUCING THE SAME

CROSS-REFERENCE TO RELATED APPLICATION

This application is a Section 371 of International Application No. PCT/JP2004/009216, filed Jun. 23, 2004, which was published in the Japanese language on Dec. 29, 2004, under International Publication No. WO 2004/113056 A1, the disclosure of which is incorporated herein by reference.

TECHNICAL FIELD

This invention relates to a three-dimensional object formed by using an actinic radiation-curable resin composition and a method of producing the same. More specifically, it relates to a three-dimensional object which is produced by a fabricating procedure of accumulating cured resin layers layer by layer upon irradiation with an actinic radiation such as light and has a unique microstructure that cannot be found in the background art, and a method of producing the same. Owing to the specific microstructure, the three-dimensional object according to the present invention is superior particularly in mechanical properties such as impact resistance.

BACKGROUND ART

In recent years, there has been widely employed the optical stereolithographic molding method of a liquid photo curable resin composition based on data put in three-dimensional CAD, since this method makes it possible to obtain a desired three-dimensional fabricated object at a high dimensional accuracy without preparing a die or the like (see, for example, Patent Documents 1 to 6).

A typical example of optical stereolithographic molding techniques (hereinafter optical stereolithographic molding will be sometimes called "stereolithography") is a method comprising selectively irradiating the liquid surface of a liquid photo curable resin in a container with an ultraviolet laser under computer control so as to give a desired pattern, curing the resin selectively at a thickness, providing a liquid resin for a single layer on the thus cured layer, curing it by irradiating with an ultraviolet laser in the same manner, and repeating the buildup procedure for obtaining cured layers to thereby give a three-dimensionally object. This stereolithography is widely employed today, since an object in considerably complicated shape can be easily produced thereby within a relatively short period of time.

Resins or resin compositions to be used in the stereolithography should have various characteristics, for example, having a high cure sensitivity upon irradiation with an actinic radiation, a fabricated object having a favorable resolution and a high fabricating accuracy, having a low volume shrinkage after curing, a cured object having excellent mechanical properties, having a favorable self-adhesiveness, having favorable curing properties under oxygen atmosphere, having a low viscosity, being excellent in water resistance and moisture resistance, absorbing little water or moisture with the passage of time, being excellent in dimensional stability and so on.

As photo curable resin compositions for stereolithography, various photo curable resin compositions such as photo curable resin compositions containing a radical-polymerizable organic compound; photo curable resin compositions containing a cationic-polymerizable organic compound; and photo curable resin compositions containing both of a radical-polymerizable organic compound and a cationic-polymerizable organic compound have been proposed and used. Examples of the radical-polymerizable organic compound to be used in these cases include (meth)acrylate compounds, urethane (meth)acrylate compounds, polyester (meth)acrylate compounds, polyether (meth)acrylate compounds, epoxy (meth)acrylate compounds and so on, while examples of the cationic-polymerizable organic compound include various epoxy compounds, cyclic acetal compounds, thiirane compounds, vinyl ether compounds, lactones and so on.

It has been a practice to control various properties such as the fabricating speed and the fabricating accuracy in the stereolithography, and dimensional accuracy, mechanical properties, water resistance and moisture resistance of the object obtained by stereolithography, by appropriately selecting a polymerizable component constituting a photo curable resin composition or combining two or more specific polymerizable components.

For example, it is known that an object by stereolithography having a high dimensional stability can be obtained by using a photo curable resin composition containing a cationic-polymerizable epoxy compound. In a photo curable resin composition containing epoxy compounds, moreover, it is proposed to use a photo curable resin composition which contains a cationic-polymerizable organic compound such as an epoxy compound together with a radical-polymerizable organic compound such as a (meth)acrylate compound so as to relieve a lowering in the fabricating speed caused by the epoxy compound having a low reaction speed (see, for example, Patent Document 7).

Although objects by stereolithography, which are obtained by the existing techniques, are excellent in fabricating accuracy, dimensional accuracy, heat resistance, tensile strength, water resistance, chemical resistance and so on, they are still insufficient in impact resistance, etc. For example, although the above-described object obtained by using a photo curable resin composition containing a cationic-polymerizable organic compound such as an epoxy compound together with a radical-polymerizable organic compound such as a (meth)acrylate compound is excellent in dimensional stability and so on, it is easily destroyed because of having an insufficient impact resistance.

With the diffusion of the stereolithographic techniques, there have been produced fabricated objects having complicated shapes or structures. For example, various fabricated objects having thin parts and small-sized parts are produced. When a fabricated object has a poor impact resistance in such a case, the object frequently suffers from breakage at a thin part or a small-sized part in the course of the production or utilization thereof. In recent years, moreover, fabricated objects are produced not only as mere models (dummies) but also as products for practical use such as matrices, processing members and machine parts. In these cases, it is required that the fabricated object are excellent in impact resistance as well as tensile strength. However, objects by stereolithography in the background art are still unsatisfactory from the viewpoint of impact resistance.

There has been known a photo curable resin composition comprising organic polymer solid particles and/or inorganic solid particles having a particle diameter of from 3 to 70 μm (see Patent Document 8). An object by stereolithography, which is produced by using the photo curable resin composition described in this Patent Document 8, has a phase state wherein the organic polymer solid particles and/or inorganic solid particles having a particle diameter of 3 to 70 μm are dispersed in the photo cured resin. Since the organic polymer solid particles and/or inorganic solid particles having a particle diameter of 3 to 70 μm are dispersed in the photo cured resin phase, this object has a low volume shrinkage and a high dimensional stability. Moreover, it has favorable properties, for example, excellent mechanical properties such as tensile strength and flexural strength, compared with a three-dimensional molded object without the above-described solid particles. As the results of examinations by the present inventors, however, it is clarified that the object by stereolithography has an insufficient toughness (or durability) in the photo cured resin phase and there is still room for improvement in the impact resistance thereof.

Furthermore, attempts have been made to add a specific polyether having hydroxyl groups at both ends to a resin composition for stereolithography containing a cationic-polymerizable compound having epoxy group and an a radiation-sensitive cationic-polymerization initiator to thereby prevent curing failure of the composition caused by oxygen, decrease shrinkage upon curing and improve the dimensional stability, load deflection and tensile elongation thereof (see Patent Document 9). As the results of investigations by the present inventors, however, it is clarified that a high load deflection and a favorable tensile elongation are hardly compatible in an object by stereolithography, which is obtained from the resin composition for stereolithography as reported by this Patent Document 9 and, moreover, the object has an insufficient impact resistance.

(Patent Document 1) JP-A-56-144478
(Patent Document 2) JP-A-60-247515
(Patent Document 3) JP-A-62-35966
(Patent Document 4) JP-A-2-113925
(Patent Document 5) JP-A-2-153722
(Patent Document 6) JP-A-3-41126
(Patent Document 7) JP-B-7-103218
(Patent Document 8) JP-A-7-26060
(Patent Document 9) JP-A-2003-73457

DISCLOSURE OF THE INVENTION

An object of the present invention is to provide a three-dimensional object (an object by stereolithography) which is superior in dimensional stability, mechanical properties such as tensile strength, and appearance and so on and, particularly superior in impact resistance and a method of producing the same.

To overcome the above problem, the present inventors conducted intensive studies. In the course of the studies, they researched and investigated microstructures of cured resins constituting an object by stereolithography, which is obtained by photo curable resin compositions, and therefore found that the microstructures in the cured resin parts closely relate to the physical properties such as impact resistance of the object. As the results of subsequent studies, the present inventors have successfully produced a unique object by stereolithography, including a plurality of photo cured resin layers each having a microphase structure wherein island components, which contains a polymer differing from a cured resin constituting the sea component and are in the form of extremely fine particles at a nanometer level, are dispersed in the sea component containing the photo cured polymer. As the results of further detailed studies on the structure and physical properties of the thus obtained object by stereolithography, it has been also found that an object by stereolithography, including photo cured resin layers each having a sea-island microstructure, wherein fine island components which contain a polymer differing from a cured resin constituting the sea component and have a particle diameter of 20 to 2,000 nm are dispersed in the sea component containing the cured polymer, has a remarkably improved impact resistance compared with the existing objects by stereolithography containing a single photo cured resin layer not having such a sea-island structure as described above.

The present inventors have also found that the impact resistance of the object by stereolithography is further improved in the case where the polymer constituting the island components in the sea-island microstructure as described above has a glass transition temperature of lower than 40° C.

The present inventors have also found that a three-dimensional object having not only an improved impact resistance but also a further improved tensile strength and so on can be obtained in the case where, in each of the cured resin layers of the specific sea-island microstructure as described above, the island components do not exist in the upper portion located in the actinic radiation-irradiated surface of each cured resin layer but exist in a portion from the bottom part of each cured resin layer to an upward portion along the thickness direction of the each cured resin layer. This is because the upper portion having no island component contributes to the improvement of the tensile strength and so on.

The present inventors have also found that an object by stereolithography having the above-described sea-island microstructure can be smoothly produced by stereolithography a composition prepared by homogeneously blending an actinic radiation-curable resin composition containing a the base component a polymerizable compound capable of undergoing polymerization upon irradiation with an actinic radiation such as light with a polyalkylene ether compound having a number-average molecular weight of 500 to 10,000 as a component for forming the polymeric island components, and that a cationic organic compound such as an epoxy compound is preferred as a polymerizable compound for forming the photo cured sea component and the combined use of a cationic-polymerizable organic compound such as an epoxy compound with a radical-polymerizable organic compound such as a (meth)acrylate compound is still preferred.

The present inventors have furthermore found that, by using an oxetane compound (in particular, an oxetane monoalcohol compound) in the actinic radiation-curable resin composition in producing a fabricated object having the above-described sea-island microstructure with the use of the actinic radiation-curable resin composition containing a cationic-polymerizable organic compound such as an epoxy compound, the reaction speed is elevated and thus the fabricating time can be shortened and, moreover, the sea-island structure comprising fine island components with a particle diameter of 20 to 2,000 nm can be smoothly formed. The present invention has been completed based on these various findings.

Accordingly, the present invention relates to:

(1) A three-dimensional object comprising a plurality of cured resin layers accumulated to each other, each of the cured resin layers having a shaped pattern formed by irradiating a molding surface of an actinic radiation-curable resin composition with an actinic radiation, wherein the three-dimensional object comprises at least cured resin layer comprising a sea-island microstructure in which island components are dispersed in a sea component comprising a cured polymer, the island components comprise a polymer differing from the cured resin constituting the sea component, and the island components are fine island components having a particle diameter of 20 to 2,000 nm.

The present invention further relates to:

(2) A three-dimensional object as described in the above (1), wherein all of the plurality of cured resin layers constituting the three-dimensional object have the sea-island microstructure in which island components are dispersed in a sea component comprising a cured polymer, the island components comprise a polymer differing from the cured resin constituting the sea component, and the island components are fine island components having a particle diameter of 20 to 2,000 nm;

(3) A three-dimensional object as described in the above (1) or (2), wherein each of the cured resin layers constituting the three-dimensional object has a thickness of 10 to 500 µm;

(4) A three-dimensional object as described in any of the above (1) to (3) wherein, in each of the cured resin layers having the sea-island microstructure, the island components do not exist in an upper portion of the each of the cured resin layers, the upper portion being located in an actinic radiation-irradiated surface of the each of the cured resin layers, and the island components exist in a portion from the bottom part of the each of the cured resin layers to an upward part along the thickness direction of the each of the cured resin layers; or (5) A three-dimensional object as described in the above (4), wherein the upper portion containing no island component has a thickness of 2 to 10% with respect to the thickness of the each of the cured resin layers.

The present invention further relates to:

(6) A three-dimensional object as described in any of the above (1) to (5), wherein each of the cured resin layers having the sea-island microstructure has a sum of the island components of 1 to 30% by mass with respect to the mass of the each of the cured resin layers;

(7) A three-dimensional object as claimed in any of the above (1) to (6), wherein the polymer constituting the island components has a glass transition temperature of lower than 40° C.; or (8) A three-dimensional object as described in any of the above (1) to (7), wherein the polymer constituting the island components is a polyalkylene ether compound having a number average molecular weight of 500 to 10,000.

The present invention further relates to:

(9) A three-dimensional object as described in any of the above (1) to (8), wherein the sea component comprises the cured resin formed by using at least one actinic radiation-polymerizable compound selected from the group consisting of a cationic-polymerizable organic compound capable of undergoing cationic polymerization upon irradiation with an actinic radiation and a radical-polymerizable organic compound capable of undergoing radical polymerization upon irradiation with an actinic radiation;

(10) A three-dimensional object as described in any of the above (1) to (9), wherein the sea component comprises the cured resin formed by using both of a cation-polymerizable organic compound and a radical-polymerizable organic compound; or

(11) A three-dimensional object as described in the above (9) or (10), wherein the cation-polymerizable organic compound is a compound having an epoxy group, and the radical-polymerizable organic compound is a compound having a (meth)acryl group.

The present invention further relates to:

(12) A method of producing a three-dimensional object having a sea-island microstructure as described in the above (1), which comprises: irradiating a molding surface of an actinic radiation-curable resin composition with an actinic radiation to form a cured resin layer having a shaped pattern; and repeating a fabricating procedure comprising: providing an actinic radiation-curable resin composition for one layer on a cured resin layer to form a molding surface; and irradiating the molding surface with an actinic radiation to form a cured resin layer having a shaped pattern, so as to produce the three-dimensional object comprising a plurality of cured resin layers accumulated to each other, wherein the fabricating procedure is performed by using an actinic radiation-curable resin composition comprising a homogeneous mixture of an actinic radiation-curable resin component with a component to become polymeric island components having a particle diameter of 20 to 2,000 nm upon irradiation, and the actinic radiation-curable resin component is capable of forming a cured resin as a sea component upon the irradiation.

The present invention further relates to:

(13) A production method as described in the above (12), wherein the actinic radiation-curable resin composition comprises: at least one actinic radiation-polymerizable compound as the cured resin of the sea component, the at lease one active ray-polymerizable compound being selected from the group consisting of a cationic-polymerizable organic compound capable of undergoing cationic polymerization upon irradiation with an actinic radiation and a radical-polymerizable organic compound capable of undergoing radical polymerization upon irradiation with an actinic radiation; and a polyalkylene ether compound having a number-average molecular weight of 500 to 10,000 as the polymer to become the polymeric island components; or

(14) A production method as described in the above (12) or (13), wherein the cationic-polymerizable organic compound is a compound having an epoxy group and the radical-polymerizable organic compound is a compound having a (meth)acryl group.

Moreover, the present invention relates to:

(15) A production method as described in any of the above (12) to (14), wherein a content of the polymer to become the polymeric island components is from 1 to 30% by mass with respect to the mass of the actinic radiation-curable resin composition used for forming the cured resin layer having the sea-island microstructure; or

(16) A production method as described in any of the above (12) to (15), wherein the actinic radiation-curable resin composition contains an oxetane compound together with a cationic-polymerizable organic compound having an epoxy group.

In the three-dimensional object according to the present invention, each of the cured resin layers constituting the three-dimensional object has a unique sea-island microstructure wherein fine island components which contain a polymer differing from a cured resin constituting the sea component and have a particle diameter of 20 to 2,000 nm are dispersed in the sea component containing the cured polymer. Thus, this three-dimensional object (object by stereolithography) is much superior in toughness to the existing objects by stereolithography (three-dimensional objects) and, in its turn, has an extremely superior impact resistance.

In addition to the high impact resistance as described above, the three-dimensional object according to the present invention is superior in dimensional stability, mechanical properties such as tensile strength and other properties such as water resistance, moisture resistance and heat resistance. Owing to these characteristics, it is effectively usable not only for typical prototype models but also for actual parts for practical use, e.g., actual components.

The three-dimensional object according to the present invention having the specific sea-island microstructure and superior properties as discussed above can be smoothly produced by the production method according to the present invention.

BREIF DESCRIPTION OF THE DRAWINGS

Figure 1:
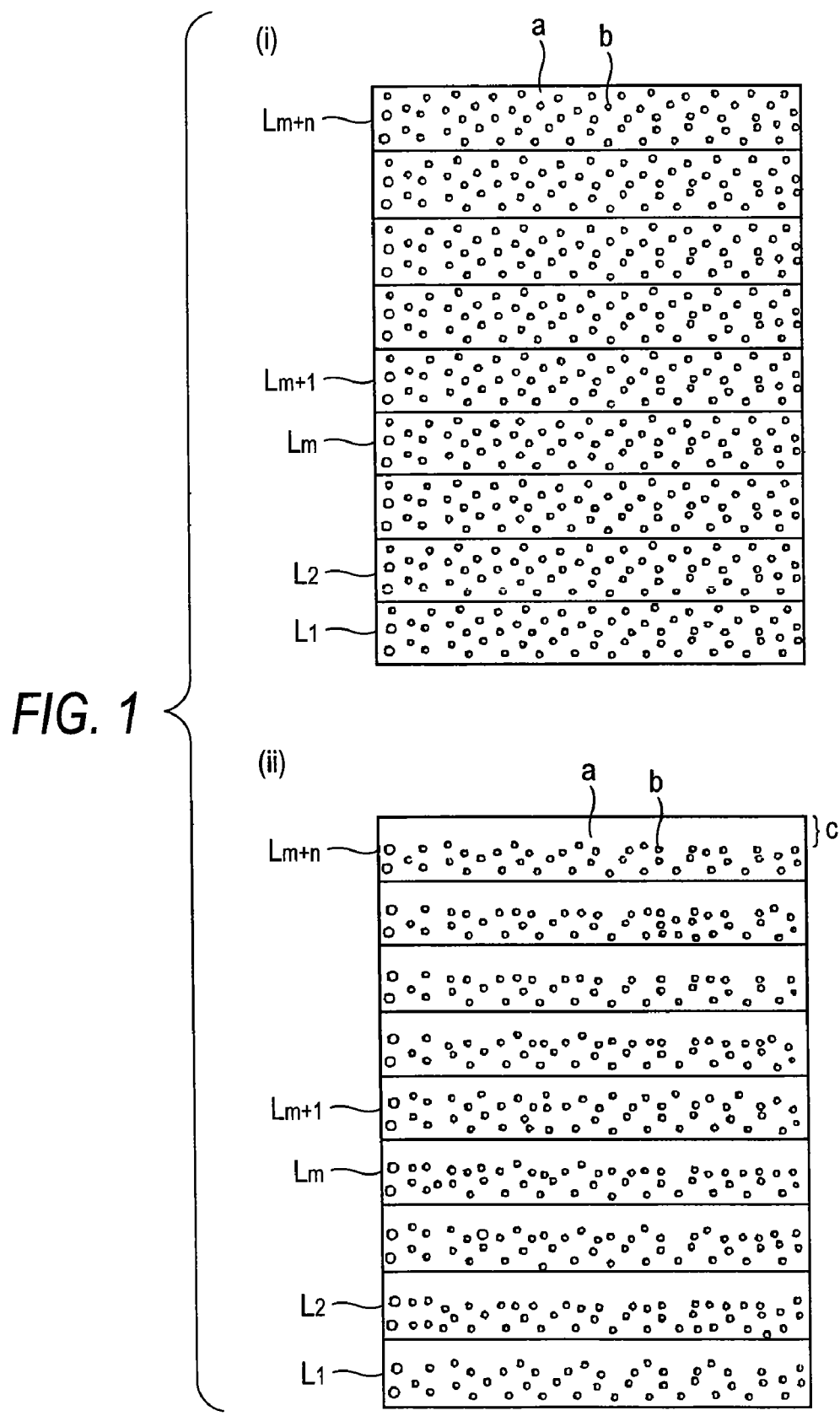
FIG. 1 is a drawing schematically showing an example of the sea-island microstructure of the three-dimensional object according to the present invention.

In these figures, a stands for a sea component made of cured resin; b stands for an island component; and c stands for an island-free part of a cured resin layer.

BEST MODE FOR CARRYING OUT THE INVENTION

Next, the present invention will be illustrated in greater detail.

A three-dimensional object according to the present invention is a three-dimensionally object formed by accumulating a plurality of cured resin layers which have a shaped pattern s formed by irradiating a molding surface of an actinic radiation-curable resin composition with an actinic radiation.

The term "actinic radiation" as used in this specification means an energy beam capable of curing a resin composition for stereolithography such as ultraviolet ray, electron beam, X-ray or radial ray. Accordingly, the term "actinic radiation-curable resin composition" to be used in producing a three-dimensional object according to the present invention means a resin composition which is cured upon irradiation with one or more actinic radiations (energy beams) as described above.

In a three-dimensional object according to the present invention, at least part of the plurality (a large number) of cured resin layers constituting the three-dimensional object (i.e., all or some of the plurality of cured resin layers) have a sea-island microstructure wherein fine island components which contain a polymer differing from a cured resin constituting the sea component and have a particle diameter of 20 to 2,000 nm are dispersed in the sea component of the cured polymer.

In the case where the particle diameter of the island component is less than 20 nm, the impact resistance of the three-dimensional object is lowered. In the case where the particle diameter thereof exceeds 2,000 nm, on the other hand, the mechanical properties such as mechanical strength are lowered. The particle diameter of the island component preferably ranges from 30 to 1,500 nm, still preferably from 40 to 1,000 nm and still preferably from 50 to 500 nm.

The expression "all of the plurality of cured resin layers constituting the three-dimensional object have a sea-island microstructure wherein island components are dispersed in a sea component of the cured resin" means that all layers of the plurality (a large number) of cured resin layers constituting the three-dimensional object individually have the sea-island microstructure as described above.

The expression "some of the plurality of cured resin layers constituting the three-dimensional object have a sea-island microstructure wherein island components are dispersed in a sea component of the cured resin" means that part (some layers) of the plurality (a large number) of cured resin layers constituting the three-dimensional object individually have the sea-island microstructure as described above while the remainder of the cured resin layers have a structure containing no island component (a non-sea-island structure).

In a three-dimensional object according to the present invention, it is favorable from the viewpoint of achieving a favorable impact resistance of the whole three-dimensional object that all layers of the cured resin layers constituting the three-dimensional object have the microstructure wherein fine island components which have a particle diameter of 20 to 2,000 nm are dispersed in the sea component made of the cured polymer.

In a three-dimensional object according to the present invention, the thickness of a single cured resin layer may vary depending on the type and composition ratio of the actinic radiation-curable resin composition to be used in producing the three-dimensional object, the type and energy intensity of the actinic radiation, the fabricating speed and so on. By considering the type and energy intensity of the actinic radiation, the fabricating speed, the fabricating accuracy, the mechanical properties of the obtained three-dimensional object and so on, it is generally preferable that the thickness ranges from 10 to 500 μm, still preferably from 30 to 300 μm and still preferably from 50 to 200 μm. In the case where the thickness of a single cured resin layer is less than 10 μm, a fabricating procedure of forming an extremely large number of cured resin layers layer by layer is required for producing a three-dimensional object and thus a long fabricating time is required, i.e., being impractical. In the case where the thickness of a single cured resin layer exceeds 500 μm, on the other hand, the obtained three-dimensional object frequently suffers from lowering in the fabricating accuracy, the dimensional accuracy and the mechanical properties.

In a single cured resin layer (each cured resin layer) of a three-dimensional object according to the present invention, the island components may be evenly or almost evenly dispersed in each cured resin layers. Alternatively, the island components may be unevenly distributed in each cured resin layer.

Preferred examples of a mode wherein the island components are unevenly dispersed in each cured resin layer include a mode wherein the island components do not exist in the upper portion located in the actinic radiation-irradiated surface of the cured resin layer but are dispersed in a portion from the bottom part of the cured resin layer to an upward part along the thickness direction of the cured resin layer. In such a mode with uneven distribution, it is preferred that the island components do not exist in the upper portion corresponding to from 2 to 10% of the thickness of a single layer from the actinic radiation-irradiated surface but are dispersed in the lower portion (i.e., the portion corresponding to 98 to 90% of the thickness of each cured resin layer). In the mode with the uneven distribution as described above, the upper thickness portion having no island component (preferably the thickness portion corresponding to 2 to 10% as described above) contributes to the impartment of mechanical strength such as tensile strength to the three-dimensional object, whereas the lower thickness portion having the island components dispersed therein (preferably the thickness portion corresponding to 98 to 90% as described above) contributes to the impartment of impact resistance to the three-dimensional object. Consequently, a three-dimensional object being superior in mechanical strength such as tensile strength and impact resistance can be obtained.

Based on the illustration as discussed above, the layer structure in the vertical section of the three-dimensional object according to the present invention will be illustrated by reference to FIG. 1 (the appearance of the three-dimensional object being omitted), though the invention is not restricted thereto.

FIG. 1(i) shows an example of a mode wherein island components b are almost evenly distributed in the sea components a in all of the cured resin layers ($L_1$ to $L_{m+n}$) constituting the three-dimensional object.

FIG. 1(ii) shows an example of another mode wherein island components b are distributed in the sea components a in all of the cured resin layers ($L_1$ to $L_{m+n}$) constituting the three-dimensional object but, in each cured resin layer, the island components b do not exist in the upper portion (the part c) located in the actinic radiation-irradiated surface but are unevenly dispersed in the lower portion thereof.

From the viewpoints of the tensile strength, impact resistance, heat resistance and so on of the three-dimensional object, it is preferable in a three-dimensional object according to the present invention that, in each of the cured resin layers having the sea-island microstructure, the sum of the island components contained in each cured resin layer is from 1 to 30% by mass, still preferably from 5 to 25% by mass, with respect to the mass of the cured resin layer having the sea-island microstructure. In the case where the sum of the island components in each cured resin layer having the sea-island microstructure is less than 1% by mass, it is frequently observed that only an insufficient effect of improving the impact resistance of the three-dimensional object can be obtained. In the case where the sum thereof exceeds 30% by mass, on the other hand, it is frequently observed that the tensile strength, hardness, heat resistance and so on of the three-dimensional object are worsened.

In a three-dimensional object according to the present invention, the polymer forming the island components may be dispersed in the sea component in the state of being bonded (for example, chemically bonded) to the polymer forming the sea component. Alternatively, it may be dispersed in the sea component in a separated state without being bonded to the polymer forming the sea component.

In a three-dimensional object according to the present invention, the polymer forming the island components may be an arbitrary polymer so long as it can be sedimented and dispersed as island components of 20 to 2,000 nm in particle diameter in the sea component of the cured resin when irradiated with the actinic radiation. As the polymer for forming the island components, it is generally preferable to employ a polymer having a chain-type or almost chain-type structure which can be homogeneously mixed (preferably dissolved) in the actinic radiation-curable resin composition for forming the cured resin layer having the sea-island microstructure.

In a three-dimensional object according to the present invention, it is preferable from the viewpoint of improving the impact resistance, flexibility and so on of the three-dimensional object that the island components are made of a polymer having a glass transition temperature lower than 40° C. It is still preferable that the island components are made of a polymer having a glass transition temperature lower than 30° C., still preferably a polymer having a glass transition temperature lower than 20° C. In the case where the glass transition temperature of the polymer forming the island components is excessively high, a three-dimensional object having a superior impact resistance can be hardly obtained.

The term "glass transition temperature" as used in this specification means the glass transition temperature that is measured by using the polymer forming the island components alone without dispersing the polymer in the sea component. This glass transition temperature is measured as the temperature Tg(° C.) detected at the specific heat deflection point in the DSC measurement of the polymer or as the temperature derived from the maximum peak of tan δ measured with a dynamic viscoleastometer, namely, the point at which the elastic modulus shows a rapid decrease.

In a three-dimensional object according to the present invention, it is preferable that the island components are made of a polyalkylene ether compound having a number-average molecular weight of 500 to 10,000, still preferably a polyalkylene ether compound having a number-average molecular weight of 1,000 to 5,000 from the viewpoint that the fine island components having a particle diameter of 20 to 2,000 nm can be favorably dispersed in the sea component made of the cured resin. The term "a polyalkylene ether compound" as used herein means a compound comprising multiple oxyalkylene units (alkylene ether units) (—R—O— (wherein R is an alkylene group)) of the same or different types bonded together or its derivative. The number-average molecular weight of the polyalkylene ether compound as used herein means the number-average molecular weight measured by the gel permeation chromatography (GPC) with the use of polystyrene as the standard.

In a three-dimensional object according to the present invention, it is particularly preferable that the island components are made of a polyalkylene ether compound represented by the following general formula (I):

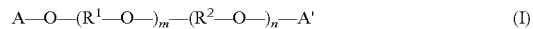

$$A-O-(R^1-O-)_m-(R^2-O-)_n-A' \qquad (I)$$

wherein $R^1$ and $R^2$ are different from each other and each represents a straight-chain or branched alkylene group having from 2 to 10 carbon atoms; A and A' independently represent each a hydrogen atom, an alkyl group, a phenyl group, an acetyl group or a benzoyl group; and m and n independently represent each 0 or an integer of 1 or above (provided that at least one of m and n does not represent 0).

In the case where both of m and n in the polyalkylene ether compound represented by the above general formula (I) (hereinafter sometimes referred to as the polyalkylene ether compound (I)) are integers of 1 or above and the sum of m and n is 3 or above, the oxyalkylene unit (alkylene ether unit): —$R^1$—O— and the oxyalkylene unit (alkylene ether unit): —$R^2$—O— may be bonded either via random bond or via block bond. Alternatively, a mixture of random bond with block bond may be employed.

In the above-described polyalkylene ether compound (I), specific examples of $R^1$ and $R^2$ include an ethylene group, an n-propylene group, an isopropylene group, an n-butylene group (a tetramethylene group), an isobutylene group, a tert-butylene group, straight-chain or branched pentylene groups (for example, —$CH_2CH_2CH_2CH_2CH_2$— and —$CH_2CH_2CH(CH_3)CH_2$—), straight-chain or branched hexylene groups (for example, —$CH_2CH_2CH_2CH_2CH_2CH_2$—, —$CH_2CH_2CH(CH_3)CH_2CH_2$— and —$CH_2CH_2CH(C_2H_5)CH_2$—), heptylene groups, octylene groups, nonylene groups, decanylene groups and so on. Among them, it is preferred that $R^1$ and $R^2$ are any groups selected from among ethylene group, an n-propylene group, an isopropylene group, an n-butylene group (a tetramethylene group), an n-pentylene group, a branched pentylene group represented by the formula —CH₂CH₂CH(CH₃)CH₂—, an n-hexylene group and branched hexylene groups represented by the formula:

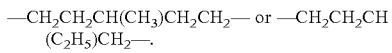
—CH₂CH₂CH(CH₃)CH₂CH₂— or —CH₂CH₂CH(C₂H₅)CH₂—.

In the above-described polyalkylene ether compound (I), specific examples of A and A' include a hydrogen atom, a methyl group, an ethyl group, a propyl group, a butyl group, a phenyl group, an acetyl group, a benzoyl group and so on. Among them, it is preferred that at least one of them, in particular, both of them are hydrogen atoms. In the case where at least one of A and A' is a hydrogen atom, the hydroxyl groups at both ends of the polyalkylene ether compound react with the resin component forming the sea component upon the irradiation of the actinic radiation-curable resin composition containing the polyalkylene ether compound with the actinic radiation to form a single cured resin layer. As a result, the island components formed by the polyalkylene ether compound, which has been bonded to the cured resin forming the sea component, are stable dispersed in the sea component.

In the above-described polyalkylene ether compound (I), it is preferred that m and n respectively showing the numbers of the repeating oxyalkylene units are such values as controlling the number-average molecular weight of the polyalkylene ether compound within the range of 500 to 10,000.

Appropriate examples of the above-described polyalkylene ether compound (I) include polyethylene glycol, polypropylene glycol, polytetramethylene glycol, polyethylene oxide-polypropylene oxide block copolymer, ethylene oxide-propylene oxide random copolymer, a polyether comprising oxytetramethylene units having alkyl substituent (tetramethylene ether units having alkyl substituent) represented by the formula: —CH₂CH₂CH(R⁵)CH₂O— (wherein R⁵ represents a lower alkyl group, preferably a methyl or ethyl group) bonded together, a polyether comprising oxytetramethylene units and the above-described oxytetramethylene units having alkyl substituent represented by the formula: —CH₂CH₂CH(R⁵)CH₂O— (wherein R⁵ is as defined above) bonded together at random, and so on. The island components may be made of one of the above-described polyalkylene ether compounds or two or more thereof, so long as the island component mass does not exceeds the composition ratio as described above.

Among them, it is preferred to use polytetramethylene glycol having a number-average molecular weight of 500 to 10,000 as described above and/or a polyether comprising teramethylene ether units with tetramethylene ether units having alkyl substituent represented by the formula: —CH₂CH₂CH(R⁵)CH₂O— (wherein R⁵ is as defined above) bonded together at random, since fine island components having a particle diameter of 20 to 2,000 nm can be easily formed in the island component made of the cured resin to give a three-dimensional object having a low hygroscopicity and being superior in dimensional stability and mechanical stability.

Each of the cured resin layers constituting the three-dimensional object (in particular, the sea component in a cured resin layer having the sea-island microstructure) may be made of any of active energy-polymerizable (curable) organic compounds having been employed in stereolithographic techniques with the use of actinic radiations. Among them, it is preferable that the cured resin layer is made of a cured resin which is formed by using at least one of a cationic-polymerizable organic compound capable of undergoing cationic polymerization upon irradiation with an actinic radiation and a radical-polymerizable organic compound capable of undergoing radical polymerization upon irradiation with an actinic radiation. It is still preferable that the cured resin layer is made of a cured resin which is formed by using both of a cationic-polymerizable organic compound and a radical-polymerizable organic compound, from the viewpoints of the dimensional stability, heat resistance, moisture resistance, mechanical properties and so on of the three-dimensional object.

As the cationic-polymerizable organic compound in this step, use may be made of any compound capable of undergoing a polymerization reaction and/or a crosslinkage reaction upon irradiation with an actinic radiation in the presence of an actinic radiation-sensitive cationic polymerization initiator. Typical examples thereof include epoxy compounds, cyclic ether compounds, cyclic acetal compounds, cyclic lactone compounds, cyclic thioether compounds, spiroorthoester compounds, vinyl ether compounds and so on. In the present invention use may be made of either one or more of the cationic-polymerizable organic compounds as described above.

Specific examples of the cationic-polymerizable organic compound are as follows:

(1) epoxy compounds such as alicyclic epoxy resins, aliphatic epoxy resins and aromatic epoxy resins;

(2) trimethylene oxide, oxetane compounds such as 3,3-dimethyloxetane, 3,3-dichloromethyloxetane, 3-methyl-3-phenoxymethyloxetane and 1,4-bis((3-ethyl-3-oxetanylmethoxy)methyl)benzene, oxolane compounds such as tetrahydrofuran and 2,3-dimethyltetrahydrofuran and cyclic ether or cyclic acetal compounds such as trioxane, 1,3-dioxolane and 1,3,6-trioxane cyclooctane;

(3) cyclic lactone compounds such as β-propiolactone and ε-caprolactone;

(4) thiirane compounds such as ethylene sulfide and thioepichlorohydrin;

(5) thiethane compounds such as 1,3-propyn sulfide and 3,3-dimethylthiethane;

(6) vinyl ether compounds such as ethylene glycol divinyl ether, alkyl vinyl ether, 3,4-dihydropyran-2-methyl (3,4-dihydropyran-2-carboxylate) and triethylene glycol divinyl ether;

(7) spiroorthoester compounds obtained by reacting an epoxy compound with a lactone;

(8) ethylenically unsaturated compounds such as vinyl cyclohexane, isobutylene and polybutadiene; and so on.

Among the above-described compounds, it is preferred to use an epoxy compound as the cationic-polymerizable organic compound for forming the sea component. It is still preferable to use a polyepoxy compound having two or more epoxy groups per molecule. By using epoxy compounds (a mixture of epoxy compounds) containing an alicyclic polyepoxy compound having two or more epoxy groups per molecule and the content of the alicyclic polyepoxy compound being 30% by weight or more, still preferably 50% by weight or more, with respect to the total weight of the epoxy compounds as the cationic-polymerizable organic compound, in particular, it is possible to further improve the cationic polymerization speed, the thick film curability, the resolution, the actinic radiation permeability and so on in the production of the three-dimensional object. In this case, moreover, the viscosity of the actinic radiation-curable resin composition is lowered and, therefore, molding can be smoothly carried out. As a result, the obtained three-dimensional object has a further lowered volume shrinkage.

Examples of the alicyclic epoxy resin as described above include polyglycidyl ether of a polyhydric alcohol having at least one alicyclic ring, a cyclohexene oxide or cyclopentene oxide-containing compound obtained by epoxidizing a cyclohexne or cyclopentene ring-containing compound with an appropriate oxidizing agent such as hydrogen peroxide or a peracid, and so on. More specifically speaking, examples of the alicyclic epoxy resin include hydrogenated bisphenol A diglycidyl ether, 3,4-epoxycyclohexylmethyl-3,4-epoxy-cyclohexane carboxylate, 2-(3,4-epoxycyclohexyl-5,5-spiro-3,4-epoxy)cyclohexane-meth-dioxane, bis(3,4-epoxycyclohexylmethyl) adipate, vinylcyclohexene dioxide, 4-vinylepoxycyclohexane, bis(3,4-epoxy-6-methylcyclohexylmethyl) adipate, 3,4-epoxy-6-methylcyclohexyl-3,4-epoxy-6-methylcyclohexane carboxylate, methylenebis(3,4-epoxycyclohexane), dicyclopentadiene diepoxide, di(3,4-epoxycyclohexylmethyl) ether of ethylene glycol, ethylenebis(3,4-epoxycyclohexane carboxylate), dioctyl epoxyhexahyrophthalate, di-2-ethylhexyl epoxyhexahydrophthalate and so on.

Examples of the above-described aliphatic epoxy resin include homopolymers and copolymers of polyglycidyl ether of an aliphatic polyhydric alcohol or its alkylene oxide adduct and polyglycidyl ester, glycidyl acrylate or glycidyl methacrylate of an aliphatic long-chain polybasic acid and so on. More specifically speaking, examples thereof include diglycidyl ether of 1,4-butanediol, diglycidyl ether of 1,6-hexanediol, triglycidyl ether of glycerol, triglycidyl ether of trimethylolpropane, tetraglycidyl ether of sorbitol, hexaglycidyl ether of dipentaerythritol, diglycidyl ether of polyethylene glycol, diglycidyl ether of polypropylene glycol, polyglycidyl ether of a polyether polyol obtained by adding one or more alkylene oxides to an aliphatic polyhydric alcohol such as ethylene glycol, propylene glycol or glycerol, diglycidyl ether of an aliphatic long-chain dibasic acid and so on. In addition to the above-described epoxy compounds, citation may be made of, for example, monoglycidyl ether of an aliphatic higher alcohol, diglycidyl ether of a higher fatty acid, epoxidized soybean oil, butyl epoxystearate, octyl epoxystearate, epoxidized linseed oil, epoxidized polybutadiene and so on.

Examples of the above-described aromatic epoxy resin include a mono- or polyglycidyl ether of a monohydric or polyhydric phenol having at least one aromatic nucleus or its alkylene oxide. More specifically speaking, examples thereof include a glycidyl ether obtained by reacting bisphenol A, bisphenol F or an alkylene oxide adduct thereof with epichlorohydrin, epoxy novolac resin, phenol, cresol butylphenol or monoglycidyl ether of a polyether alcohol obtained by adding an alkylene oxide thereto, and so on.

The sea component in a cured resin layer of the three-dimensional object can be formed by using one or more epoxy compounds as described above. As described above, it is particularly preferred that the sea component is formed by using epoxy compounds containing a polyepoxy compound having two or more epoxy groups per molecule at a ratio of 30% by weight or more.

As the radical-polymerizable organic compound, use may be made of any compound capable of undergoing a polymerization reaction and/or a crosslinkage reaction upon irradiation with an actinic radiation in the presence of an actinic radiation-sensitive radical polymerization initiator. Typical examples thereof include compounds having (meth)acrylate group, unsaturated polyester compounds, allylurethane compounds, polythiol compounds and so on. Use can be made of one or more of the radical-polymerizable organic compounds as described above. Among them, it is preferable to use a compound having at least one (meth)acryl group. Specific examples thereof include a product of a reaction between an epoxy compound with (meth)acrylic acid, (meth)acrylic acid esters of alcohols, urethane (meth)acrylate, polyester (meth)acrylate, polyether (meth)acrylate and so on.

Examples of the above-described product of a reaction between an epoxy compound with (meth)acrylic acid include (meth)acrylate type reaction products obtained by reacting an aromatic epoxy compound, an alicyclic epoxy compound and/or an aliphatic epoxy compound with (meth)acrylic acid. Among the (meth)acrylate type reaction products as described above, (meth)acrylate type reaction products obtained by reacting an aromatic epoxy compound with (meth)acrylic acid are preferably employed. Specific examples thereof include (meth)acrylate obtained by reacting a glycidyl ether, which is obtained by reacting a bisphenol compound such as bisphenol A or bisphenol S or its alkylene oxide adduct with an epoxidizing agent such as epichlorohydrin, with (meth)acrylic acid, a (meth)acrylate type reaction product obtained by epoxy novolac resin with (meth)acrylic acid and so on.

Examples of the (meth)acrylic acid esters of alcohols as described above include (meth)acrylates obtained by reacting an aromatic alcohol, an aliphatic alcohol, an alicyclic alcohol and/or an alkylene oxide adduct thereof having at least one hydroxyl group per molecule with (meth)acrylic acid.

More specifically speaking, examples thereof include 2-ethylhexyl (meth)acrylate, 2-hydroxyethyl (meth)acrylate, 2-hydroxypropyl (meth)acrylate, lauryl (meth)acrylate, stearyl (meth)acrylate, isooctyl (meth)acrylate, tetrahydrofuryl (meth)acrylate, isobornyl (meth)acrylate, benzyl (meth)acrylate, 1,4-butanediol di(meth)acrylate, 1,6-hexanediol di(meth)acrylate, diethylene glycol di(meth)acrylate, triethylene glycol di(meth)acrylate, neopentyl glycol di(meth)acrylate, polyethylene glycol di(meth)acrylate, polypropylene glycol di(meth)acrylate, trimethylolpropane tri(meth)acrylate, pentaerythritol tri(meth)acrylate, dipentaerythritol hexa(meth)acrylate, (meth)acrylates of alkylene oxides of polyhydric alcohols such as diols, triols, tetraols and hexaols as described above, and so on.

Among them, use may be preferably made of a (meth)acrylate obtained by reacting a polyhydric alcohol with (meth)acrylic acid and having two or more (meth)acryl groups per molecule as an alcohol (meth)acrylate.

Among the (meth)acrylate compounds as described above, acrylate compounds are preferred to methacrylate compounds from the viewpoint of the polymerization speed.

Examples of the urethane (meth)acrylate as described above include (meth)acrylate obtained by reacting a hydroxyl group-containing (meth)acrylic acid ester with an isocyanate compound. As the above-described hydroxyl group-containing (meth)acrylic acid ester, a hydroxyl group-containing (meth)acrylic acid ester obtained by an esterification reaction between an aliphatic dihydric alcohol with (meth)acrylic acid. Specific examples thereof include 2-hydroxyethyl (meth)acrylate and so on. As the above-described isocyanate compound, a polyisocyanate compound having two or more isocyanate groups per molecule such as tolylene diisocyanate, hexamethylene diisocyanate or isophorone diisocyanate is preferred.

Examples of the above-described polyester (meth)acrylate include polyester (meth)acrylates obtained by reacting a hydroxyl group-containing polyester with (meth)acrylic acid.

Examples of the above-described polyether (meth)acrylate include polyether (meth)acrylates obtained by reacting a hydroxyl group-containing polyether with (meth)acrylic acid.

A three-dimensional object according to the present invention is produced by using an actinic radiation-curable resin composition containing a homogeneous mixture of an actinic radiation-curable resin component, which is capable of forming a cured resin as a sea component upon irradiation with an actinic radiation, with a component as polymeric island components having a particle diameter of 20 to 2,000 nm upon irradiation with an actinic radiation.

An actinic radiation-curable resin composition to be used in a production method according to the present invention may be any actinic radiation-curable resin composition so long as it contains a polymer (curable) component capable of forming the sea component in the formation of a single cured resin layer by irradiating a molding surface of an actinic radiation-curable resin composition with an actinic radiation, together with a polymeric component that can be sedimented and dispersed as island components having the specific particle diameter as described above.

In the above-described actinic radiation-curable resin composition to be used in the present invention, it is preferable that the content of the polymeric component as the island components corresponds to from 1 to 30% by mass, still preferably from 5 to 25% by mass, based on the mass of the actinic radiation-curable resin composition to be used for forming the cured resin layer having the sea-island microstructure. In the case where the content of the component as the polymeric island components is less than 1% by mass, the number and area of the island components are lessened and thus a three-dimensional object being superior in impact resistance and so on can be hardly obtained. In the case where the content thereof exceeds 30% by mass, on the other hand, it is frequently observed that the tensile strength, hardness, heat resistance and so on of the three-dimensional object are worsened.

In the present invention, it is preferable to use an actinic radiation-curable resin composition which contains at least one actinic radiation-polymerizable compound selected from a cationic-polymerizable organic compound capable of undergoing cationic polymerization upon irradiation with an actinic radiation and a radical-polymerizable organic compound capable of undergoing radical polymerization upon irradiation with an actinic radiation as the actinic radiation-curable resin component forming the cured resin serving as the sea component, and a polyalkylene ether compound having a number-average molecular weight of 500 to 10,000 as the component serving as the polymeric island components. It is particularly preferred to use an actinic radiation-curable resin composition which contains both of a cationic-polymerizable organic compound and a radical-polymerizable organic compound and a polyalkylene ether compound having a number-average molecular weight of 500 to 10,000, as the actinic radiation-curable resin components forming the island components. As the polyalkylene ether compound, use is preferably made of polyalkylene ether compounds represented by the above general formula (I). By using such an actinic radiation-curable resin composition, a cured resin layer having the sea-island microstructure wherein island components of extremely fine polymer particles of 20 to 2,000 nm in particle diameter are dispersed in the sea component made of the cured resin.

As the cationic-polymerizable organic compound and the radical-polymerizable organic compound in the actinic radiation-curable resin composition as described above, use can be made of one or more of various cationic-polymerizable organic compounds and radical-polymerizable organic compounds as specifically cited above.

The actinic radiation-curable resin composition containing the cationic-polymerizable organic compound and/or the radical-polymerizable organic compound contains an actinic radiation-sensitive cationic polymerization initiator (hereinafter sometimes referred to simply as "a cationic polymerization initiator") and/or an actinic radiation-sensitive radical polymerization initiator (hereinafter sometimes referred to simply as "a radical polymerization initiator").

As the cationic polymerization initiator, any polymerization initiator capable of initiating the cationic polymerization of the cationic-polymerizable organic compound can be used. Among all, it is preferable to use an onium salt releasing a Lewis acid upon the actinic radiation irradiation as the cationic polymerization initiator. Examples of such an onium salt include aromatic sulfonium salts of the group VIIa elements, aromatic onium salts of the group VIa elements, aromatic onium salts of the group Va elements and so on. More specifically speaking, examples thereof include triphenylphenacylphosphonium tetrafluoroborate, triphenylphosphonium hexafluoroantimonate, bis-(4-(diphenylsulfonio)phenyl)sulfide bisdihexafluoroantimonate, bis-(4-(di4'-hydroxyethoxyphenylsulfonio)phenyl)sulfide bisdihexafluoroantimonate, bis-(4-(diphenylsulfonio)phenyl)sulfide bisdihexafluorophosphate, diphenyliodonium tetrafluoroborate and so on.

Either one of the above-described cationic polymerization initiators or a combination of two or more thereof may be used. It is also possible to use one or more of the cationic polymerization initiators as described above together with another cationic polymerization initiator.

In order to elevate the reaction speed, it is also possible to add the cationic polymerization initiator together with a photosensitizer such as benzophenone, benzoyl alkyl ether or thioxanthone, if required.

As the radical polymerization initiator, any polymerization initiator capable of initiating the radical polymerization of the radical-polymerizable organic compound upon the actinic radiation irradiation can be used. Examples thereof include benzyl or its dialkyl acetal compounds, acetoxyphenone compounds, benzoin or its alkyl ether compounds, benzophenone compounds, thioxanthone compounds and so on.

More specifically speaking, examples of the benzyl or its dialkyl acetal compounds include benzyl dimethyl ketal, benzyl-β-methoxyethyl acetal, 1-hydroxycyclohexyl phenyl ketone and so on.

Examples of the acetophenone compounds include diethoxyacetophenone, 2-hydroxymethyl-1-phenylpropan-1-one, 4'-isopropyl-2-hydroxy-2-methyl-propiophenone, 2-hydroxy-2-methyl-propiophenone, p-dimethylaminoacetophenone, p-tert-butyldichloroacetophenone, p-tert-butyltrichloroacetophenone, p-azidobenzalacetophenone and so on.

Examples of the benzoin compounds include benzoin, benzoin methyl ether, benzoin ethyl ether, benzoin isopropyl ether, benzoin normal-butyl ether, benzoin isobutyl ether and so on.

Examples of the benzophenone compounds include benzophenone, methyl o-benzoylbenzoate, Michler's ketone, 4,4'-bisdiethylaminobenzophenone, 4,4'-dichlorobenzophenone and so on.

Examples of the thioxanthone compounds include thioxanthone, 2-methylthioxanthone, 2-ethylthioxanthone, 2-chlorothioxanthone, 2-isopropylthioxanthone and so on.

Either one of these radical polymerization initiators or a combination of two or more thereof may be used.

In the case where the actinic radiation-curable resin composition contains a cationic-polymerizable organic compound, in particular, the case of containing an epoxy compound as the cationic-polymerizable organic compound, the cationic-polymerizable organic compound shows a low reaction speed and, therefore, a long time is required for fabricating. Thus, it is favorable to add an oxetane compound thereto so as to promote the cationic polymerization. By adding an oxetane compound, in particular, an oxetane monoalcohol compound to an actinic radiation-curable resin composition containing a cationic-polymerizable organic compound comprising an epoxy compound, moreover, it is possible to smoothly produce a three-dimensional object having the microstructure wherein island components having a particle diameter of 20 to 2,000 nm are dispersed in the sea component made of a cured resin.

As the oxetane compound, use may be preferably made of an oxetane monoalcohol compound having one or more oxetane groups and one alcoholic hydroxyl group per molecule. It is particularly preferable to use an oxetane monoalcohol compound represented by the following general formula (II).

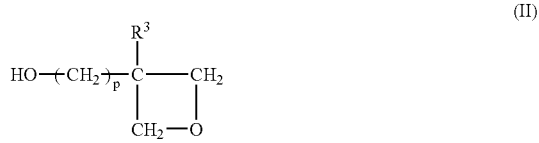

wherein $R^3$ represents an alkyl group, an aryl group or an aralkyl group; and p represents an integer of 1 to 6.

Examples of $R^3$ in the above general formula (II) include alkyl groups having from 1 to 10 carbon atoms such as methyl, ethyl, propyl, butyl, pentyl, hexyl, heptyl, octyl, nonyl and decyl, aryl groups such as phenyl, tolyl, naphthyl, methylphenyl and naphthyl, and aralkyl groups such as benzyl and β-phenylethyl. Among them, it is preferable that $R^3$ is a lower alkyl group such as methyl, ethyl, propyl or butyl.

In the above general formula (II), p is an integer of 1 to 6, preferably an integer of 1 to 4.

Specific examples of the oxetane monoalcohol compound represented by the above general formula (II) include 3-hydroxymethyl-3-methyloxetane, 3-hydroxymethyl-3-ethyloxetane, 3-hydroxymethyl-3-propyloxetane, 3-hydroxymethyl-3-normal-butyloxetane, 3-hydroxymethyl-3-phenyloxetane, 3-hydroxymethyl-3-benzyloxetane, 3-hydroxyethyl-3-methyloxetane, 3-hydroxyethyl-3-ethyloxetane, 3-hydroxyethyl-3-propyloxetane, 3-hydroxyethyl-3-phenyloxetane, 3-hydroxypropyl-3-methyloxetane, 3-hydroxypropyl-3-ethyloxetane, 3-hydroxypropyl-3-propyloxetane, 3-hydroxypropyl-3-phenyloxetane, 3-hydroxybutyl-3-methyloxetane and so on. Either one of these compounds or two or more thereof may be used. Among them, it is preferable to use 3-hydroxymethyl-3-methyloxetane or 3-hydroxymethyl-3-ethyloxetane from the viewpoint of availability, etc.

In producing a three-dimensional object according to the present invention by using an actinic radiation-curable resin composition containing a cationic-polymerizable organic compound and a radical-polymerizable organic compound together with a component serving as the polymeric island components, it is preferable from the viewpoints of the viscosity of the composition, the reaction speed, the fabricating speed, the dimensional accuracy and mechanical properties of the obtained three-dimensional object and so on that the composition contains the cationic-polymerizable organic compound and the radical-polymerizable organic compound at the ratio by mass of the cationic-polymerizable organic compound: the radical—polymerizable organic compound of 90:10 to 30 to 70, still preferably at a ratio by mass of 80:20 to 40:60.

It is preferred that the actinic radiation-curable resin composition as described above contains a cationic polymerization initiator in an amount of 1 to 10% by mass, based on the total mass of the cationic-polymerizable organic compound and the radical-polymerizable organic compound, and a radical polymerization initiator in an amount of 0.5 to 10% by mass. It is still preferable that the composition contains from 2 to 6% by mass of the cationic polymerization initiator and from 1 to 5% by mass of the radical polymerization initiator.

In the case where the actinic radiation-curable resin composition contains an oxetane monoalcohol compound, the content of the compound preferably ranges from 1 to 30% by mass, still preferably from 2 to 20% by mass, based on the mass of the cationic polymerization initiator. By controlling the content of the oxetane monoalcohol compound within the range as specified above, a three-dimensional object in which the island components having a particle diameter of 20 to 2,000 nm are dispersed in the sea component made of the cured resin and which is superior in mechanical properties, in particular, impact resistance, dimensional stability, water resistance, moisture resistance, heat resistance and so on can be smoothly produced at a high fabricating speed.

By using an actinic radiation-curable resin composition containing a radical-polymerizable organic compound, a cationic-polymerizable organic compound comprising an epoxy compound, a radical polymerization initiator and a cationic polymerization initiator and further containing a polyalkylene ether compound represented by the above-described general formula (I) and an oxetane monoalcohol compound as the actinic radiation-curable resin composition, in particular, the three-dimensional object according to the present invention having the sea-island microstructure wherein the island components having a particle diameter of 20 to 2,000 nm are dispersed in the sea component made of the cured resin can be smoothly produced.

The above-described actinic radiation-curable resin composition containing a cationic-polymerizable organic compound such as an epoxy compound, which is appropriately usable in the present invention, may contain, if desired, an oxetane compound having two or more oxetane groups per molecule but having no alcoholic hydroxyl group (hereinafter sometimes referred to as "a polyoxetane compound") together with the oxetane monoalcohol compound as described above. By adding the polyoxetane compound, the dimensional stability of the obtained three-dimensional object is further improved and the above-described sea-island microstructure can be favorably expressed. In the case of adding the polyoxetane compound, the content thereof preferably ranges from 50 to 200% by mass based on the mass of the oxetane monoalcohol compound as described above.

As examples of the polyoxetane compound, compounds represented by the following general formula (III) may be cited.

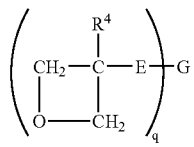

(III)

wherein R⁴ represents a hydrogen atom, a fluorine atom, an alkyl group, a fluoroalkyl group, an aryl group or an aralkyl group; E represents an oxygen atom or a sulfur atom; q represents an integer of 2 or above; and G represents a divalent or higher organic group.

In the above-described general formula (III), examples of $R^4$ include a hydrogen atom, a fluorine atom, alkyl groups having from 1 to 10 carbon atoms such as methyl, ethyl, propyl, butyl, pentyl, hexyl, heptyl, octyl, nonyl and decyl, fluoroalkyl groups substituted by one or more fluorine atoms and having from 1 to 6 carbon atoms such as fluoromethyl, fluoroethyl, fluoropropyl, fluorobutyl, fluoropentyl and fluorohexyl, aryl groups such as phenyl, tolyl, naphthyl, methylphenyl and naphthyl, aralkyl groups such as benzyl and β-phenylethyl and a furyl group. Among all, it is preferred that $R^4$ is a hydrogen atom or a lower alkyl group such as methyl, ethyl, propyl, butyl, pentyl or hexyl.

It is preferred that q is an integer of 2 to 4.

The valency G is the same as the numerical value q. Examples of G include alkylene groups having from 1 to 12 carbon atoms, divalent arylene groups such as a phenylene group and a bisphenol residue, diorganopolysiloxy groups, trivalent or tetravalent hydrocarbon groups and so on.

Appropriate examples of the compound having two or more oxetane groups per molecule include 1,4-bis((3-ethyl-3-oxetanylmethoxy)methyl)benzene, 1,4-bis(3-ethyl-3-oxetanylmethoxy)butane and so on.

An actinic radiation-curable resin composition to be used in the present invention may further contain, if desired, appropriate amount of one or more additives, for example, a coloring agent such as a pigment or a dye, a defoaming agent, a leveling agent, a thickener, a flame retardant, an antioxidant, a filler (silica, glass powder, ceramic powder, metal powder and so on), a resin for modification and so on, so long as the advantages of the present invention are not worsened thereby.

According to a production method of the invention which comprises using the above-described actinic radiation-curable resin composition, irradiating a molding surface of the actinic radiation-curable resin composition with an actinic radiation to form a cured resin layer having a shape pattern, then providing the actinic radiation-curable resin composition for one layer on the above-described cured resin layer to form a molding surface, irradiating the molding surface with the actinic radiation to form a cured resin layer having a shape pattern, and repeating this fabricating procedure, a three-dimensional object according to the present invention wherein at least part of a plurality of cured resin layers accumulated have a sea-island microstructure is produced.

Examples of the actinic radiation to be used in the above method include actinic radiations such as ultraviolet ray, electron beam, X-ray, radial ray and high frequency wave. Among them, ultraviolet ray having a wavelength of form 300 to 400 nm is preferably employed from the economical viewpoint. As the light source therefor, use can be made of an ultraviolet laser (for example, Ar laser, He—Cd laser or the like), a mercury lamp, a xenon lamp, a halogen lamp, a fluorescent lamp and so on. Among them, a laser source is preferably employed, since it can elevate the energy level so as to shorten the fabricating time and, moreover, establishes a high fabricating accuracy owing to its superior focusing ability.

According to the production method of the invention as described above, it is possible to intentionally produce, for example:

a three-dimensional object having a layered structure as shown in FIG. 1(i), namely, a three-dimensional object wherein island components b are almost evenly distributed in the sea components a in all of the cured resin layers ($L_1$ to $L_{m+n}$) constituting the three-dimensional object; or a three-dimensional object having a layered structure as shown in FIG. 1(ii), namely, a three-dimensional object wherein island components b are distributed in the sea components a in all of the cured resin layers ($L_1$ to $L_{m+n}$) constituting the three-dimensional object but, in each cured resin layer, the island components b do not exist in the upper portion (the part c) located in the actinic radiation-irradiated surface but are unevenly dispersed in the lower portion thereof.

The three-dimensional object as shown in FIG. 1(i) may be obtained by appropriately altering the composition by, for example, optionally lowering the molecular weight of the polyalkylene ether compound as described above, increasing the content of the oxetane compound, or elevating the concentration of the cationic polymerization initiator.

The three-dimensional object as shown in FIG. 1(ii) may be obtained by appropriately altering the composition by, for example, optionally elevating the molecular weight of the polyalkylene ether compound as described above, using a branched polyalkylene ether compound, decreasing the content of the oxetane compound or lowering the concentration of the cationic polymerization initiator.

Since these methods of intentionally forming three-dimensional objects are affected by the properties of a number of materials to be used in the production of the three-dimensional objects, they are not restricted to the above procedures.

A three-dimensional object according to the present invention is not restricted in the overall shape, dimension, intended use and so on thereof. Typical examples of use of a three-dimensional object according to the present invention include products for practical use such as a model for examining the appearance mode in the course of design, a model for checking the function of a part, a matrix die for structuring a template, a base model for structuring a die, a part having a complicated microstructure, a three-dimensional part having a complicated structure and so on, though the present invention is not restricted thereto. The three-dimensional object according to the present invention is particularly suitable for products for practical use such as a model of a delicate part with a need for a high impact resistance, a part having a complicated microstructure and a three-dimensional part having a complicated structure. More specifically speaking, it is usable as models of delicate parts, electric and electronic parts, furniture, architectural structures, automobile parts, various containers, template and so on, matrices, processing members and parts thereof for practical use in some cases.

To effectively use the three-dimensional object according to the present invention in the uses as described above without suffering from deformation due to heat or the like, it is preferred that the three-dimensional object according to the present invention has a heat deformation temperature determined by the method as will be described in the following EXAMPLES of 45° C. or higher, still preferably 48° C. or higher.

EXAMPLES

Now, the present invention will be described in greater detail by reference to the following EXAMPLES. However, it is to be understood that the invention is not restricted to these EXAMPLES. In these EXAMPLES, all "parts" means parts by mass.

In the following EXAMPLES, the viscosity of a photo curable resin composition was measured by putting the photo curable resin composition into a thermostat at 25° C., adjusting the liquid temperature to 25° C. and measuring the viscosity by using a B type viscometer (manufactured by Tokyo Keiki Co., Ltd.).

Further, the tensile strength, tensile elongation, tensile modulus, flexural strength and flexural modulus of a three-dimensional object (a test piece) obtained in the following EXAMPLES were measured in accordance with JIS K7113.

Furthermore, the impact strength and heat deformation temperature of a three-dimensional object (a test piece) obtained in the following EXAMPLES were measured by the following methods.

(Impact Strength)

Notched Izod impact strength was measured in accordance with JIS K7110.

(Heat Deformation Temperature)

Heat deformation temperature was measured by the method A (load on test piece=1.813 MPa) in accordance with JIS K7207.

Example 1

(1) 1,800 parts of 3,4-epoxycyclohexylmethyl-3,4-epoxycyclohexane carboxylate, 500 parts of 2,2-bis(4-(acryloxydiethoxy)phenyl)propane ("NK ESTER A-BPE-4" manufactured by Shin-Nakamura Chemical Co., Ltd.: having 4 mol of ethylene oxide unit added), 300 parts of propylene oxide-denatured pentaerythritol tetraacrylate ("ATM-4P" manufactured by Shin-Nakamura Chemical Co., Ltd.), 300 parts of 3-methyl-3-hydroxymethyloxetane and 300 parts of polytetramethylene glycol (number-average molecular weight 2,000, glass transition temperature −70° C.) were mixed together and stirred at 20 to 25° C. for about 1 hour to prepare a mixture (total mass of the mixture 3,200 parts).

(2) To the mixture obtained in the above (1), 60 parts of 1-hydroxy-cyclohexyl phenyl ketone ("Irgacure 184" manufactured by Ciba Specialty Chemicals) as a photo radical polymerization initiator, and 90 parts of "UVI-6974" manufactured by Dow Chemical Japan (prepared by dissolving 50 parts of a photo cationic polymerization initiator mixture containing bis(4-(diphenylsulfonio)phenyl)sulfide hexafluoroantimonate and (4-phenylthiophenyl)diphenylsulfonium hexafluoroantimonate at a mass ratio of 2:1 in 50 parts of propylene carbonate (solvent)) as a photo cationic polymerization initiator were added under blocking ultraviolet light. The resultant mixture was mixed while stirring at a temperature of 25° C. for about 1 hour until the components were completely dissolved to thereby give a photo curable resin composition (an actinic radiation-curable resin composition). When measured at 25° C., the viscosity of this photo curable resin composition was 368 mPa·s.

(3) By using the photo curable resin composition obtained in the above (2), a dumbbell-shaped test piece (a three-dimensional object) in accordance with JIS K7113 was produced by stereolithography with the use of an ultrahigh optically molding system ("SOLIFORM 500C" manufactured by Teijin Seiki) upon irradiation with a semiconductor laser (power 175 mW, wavelength 355 nm) at an irradiation energy of 20 to 30 mJ/cm$^2$, a slice pitch (layer thickness) of 0.1 mm and an average fabricating time per layer of 2 minutes.

(4) When the test piece obtained in the above (3) was observed with the naked eye, it was a well-fabricated object (a three-dimensional object) without any deviation. Then the tensile strength, tensile elongation, tensile modulus, flexural strength, flexural modulus, impact strength and heat deformation temperature of the test piece obtained in the above (3) were measured by the methods as described above. Table 1 shows the results.

Figure 2:
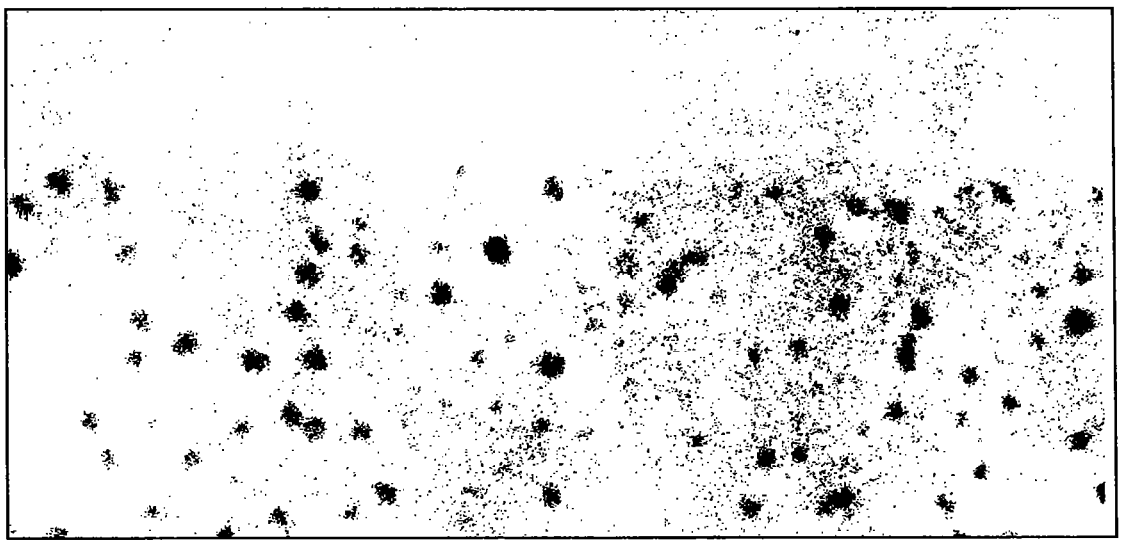
FIG. 2 is a drawing of a microscopic photograph showing the state of a section of the three-dimensional object according to the present invention obtained in EXAMPLE 1.

(5) Then, the test piece obtained in the above (3) was sliced in the longitudinal direction (thickness direction) with a microtome ("REICBRERT URTRACUT S" manufactured by LEICA) in a thickness of 50 mm. After staining with a 0.5% aqueous ruthenium tetraoxide (RuO$_4$) solution at room temperature (25° C.) for 10 minutes, the slice was observed and photographed by using a transmission electron microscope ("LEM-2000" manufactured by Topcon) under an accelerating voltage of 100 KV. As FIG. 2 (a drawing of a photograph) (35000× magnification) shows, a cured resin layer constituting the fabricated object (three-dimensional object) had a sea-island microstructure wherein island components being made of polyalkylene glycol and having a particle diameter of 20 to 50 nm were dispersed in the sea component made of the cured resin. As the drawing of the photograph of FIG. 2 shows, the island components did not exist in the upper portion of the layer (the photo irradiation surface) but were distributed in the lower portion in each cured resin layer. The thickness of the island component-free upper portion corresponded to 4.5% of the thickness of a single cured resin layer.

Example 2

(1) The procedures of (1) and (2) of EXAMPLE 1 were followed except that, in the procedure (1) of EXAMPLE 1,3,4-epoxycyclohexylmethyl-3,4-epoxycyclohexane carboxylate content is changed into 1600 parts, the mixture amount of 3-methyl-3-hydroxymethyloxetane is changed into 400 parts, and the mixture amount of polytetramethylene glycol (number-average molecular weight 2,000, glass transition temperature −70° C.), to thereby give a photo curable resin composition (an actinic radiation-curable resin composition). When measured at 25° C., the viscosity of this photo curable resin composition was 378 mPa·s.

(2) By using the photo curable resin composition obtained in the above (1), a dumbbell-shaped test piece (a three-dimensional object) in accordance with JIS K7113 was produced as in the procedure (3) of EXAMPLE 1.

(3) When the test piece obtained in the above (2) was observed with the naked eye, it was a well-fabricated object (a three-dimensional object) without any deviation.

Then the tensile strength, tensile elongation, tensile modulus, flexural strength, flexural modulus, impact strength and heat deformation temperature of the test piece obtained in the above (2) were measured by the methods as described above. Table 1 shows the results.

(4) Then, the test piece obtained in the above (2) was sliced in the longitudinal direction (thickness direction) with a microtome in a thickness of 50 nm as in the procedure (5) of EXAMPLE 1. After staining with ruthenium tetraoxide as in the procedure (5) of EXAMPLE 1, the slice was observed and photographed by using a transmission electron microscope under an accelerating voltage of 100 KV. Similar to FIG. 2 (a drawing of a photograph), a sea-island microstructure wherein island components being made of polyalkylene glycol and having a particle diameter of 20 to 50 nm were dispersed in the sea component made of the cured resin was observed. In each cured resin layer, the island components did not exist in the upper portion of the layer (the photo irradiation surface) but were distributed in the lower portion. The thickness of the island component-free upper portion corresponded to 4% of the thickness of a single cured resin layer.

Example 3

(1) The procedures of (1) and (2) of EXAMPLE 1 were followed except that, in the procedure (1) of EXAMPLE 2, 400 parts of polyether "PTG-L" manufactured by HODOGAYA CHEMICAL Co., Ltd.) (polyether comprising an oxytetramethylene unit represented by the formula: —$CH_2CH_2CH_2CH_2O$— and a side chain-containing oxytetramethylene unit having a branched structure represented by the formula: —$CH_2CH_2CH(CH_3)CH_2O$— bonded together at random, number-average molecular weight 4,000, glass transition temperature −80° C.) are substituted for polytetramethylene glycol (number-average molecular weight 2,000), to thereby give a photo curable resin composition (an actinic radiation-curable resin composition). When measured at 25° C., the viscosity of this photo curable resin composition was 568 mPa·s.

(2) By using the photo curable resin composition obtained in the above (1), a dumbbell-shaped test piece (a three-dimensional object) in accordance with JIS K7113 was produced as in the procedure (3) of EXAMPLE 1.

(3) When the test piece obtained in the above (2) was observed with the naked eye, it was a well-fabricated object (a three-dimensional object) without any deviation.

Then the tensile strength, tensile elongation, tensile modulus, flexural strength, flexural modulus, impact strength and heat deformation temperature of the test piece obtained in the above (2) were measured by the methods as described above. Table 1 shows the results.

(4) Then, the test piece obtained in the above (2) was sliced in the longitudinal direction (thickness direction) with a microtome in a thickness of 50 nm as in the procedure (5) of EXAMPLE 1. After staining with ruthenium tetraoxide as in the procedure (5) of EXAMPLE 1, the slice was observed and photographed by using a transmission electron microscope under an accelerating voltage of 100 KV. As a result, a sea-island microstructure wherein island components being made of the above-described polyether "PTG-L" and having a particle diameter of 50 to 100 nm were dispersed in the sea component made of the cured resin was observed. In each cured resin layer, the island components did not exist in the upper portion of the layer (the photo irradiation surface) but were distributed in the lower portion. The thickness of the island component-free upper portion corresponded to 5% of the thickness of a single cured resin layer.

Comparative Example 1

(1) The procedures of (1) and (2) of EXAMPLE 1 were followed but using no polytetramethylene glycol to thereby give a photo curable resin composition (an actinic radiation-curable resin composition). When measured at 25° C., the viscosity of this photo curable resin composition was 284 mPa·s.

(2) By using the photo curable resin composition obtained in the above (1), a dumbbell-shaped test piece (a three-dimensional object) in accordance with JIS K7113 was produced as in the procedure (3) of EXAMPLE 1.

(3) When the test piece obtained in the above (2) was observed with the naked eye, it was a well-fabricated object (a three-dimensional object) without any deviation.

Then the tensile strength, ensile elongation, tensile modulus, flexural strength, flexural modulus, impact strength and heat deformation temperature of the test piece obtained in the above (2) were measured by the methods as described above. Table 1 shows the results.

(4) Then, the test piece obtained in the above (2) was sliced in the longitudinal direction (thickness direction) with a microtome in a thickness of 50 nm as in the procedure (5) of EXAMPLE 1. After staining with ruthenium tetraoxide as in the procedure (5) of EXAMPLE 1, the slice was observed and photographed by using a transmission electron microscope under an accelerating voltage of 100 KV. As FIG. 3 (a drawing of a photograph) (35000× magnification) shows, a cured resin layer constituting the fabricated object (three-dimensional object) comprised a homogeneously cured resin having no island component.

TABLE 1

Figure 3:
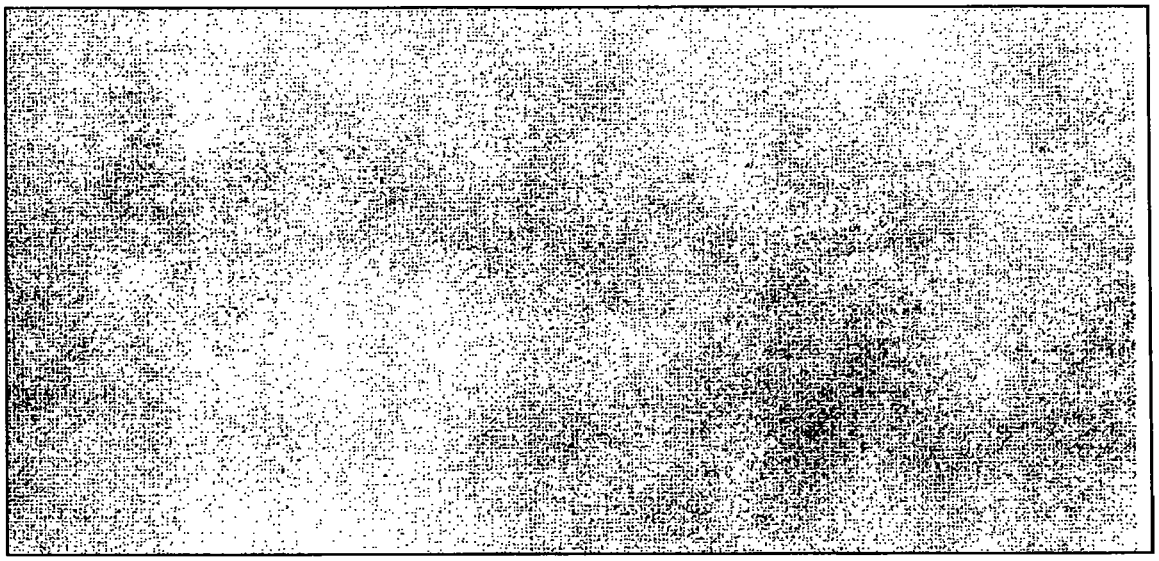
FIG. 3 is a drawing of a microscopic photograph showing the state of a section of the three-dimensional object obtained in COMPARATIVE EXAMPLE 1.

| | Example 1 | Example 2 | Example 3 | Comparative Example 1 |
|---|---|---|---|---|
| Polymer for islands | | | | |
| Type[1] | A | A | B | — |
| Content (mass %)[2] | 9.8 | 11.8 | 11.8 | 0 |
| Mechanical properties | | | | |
| Tensile strength (MPa) | 45 | 49 | 36 | 60 |
| Tensile modulus (MPa) | 1700 | 1700 | 1300 | 2000 |
| Tensile elongation (%) | 11.9 | 15.9 | 16.9 | 6.0 |
| Flexural strength (MPa) | 65 | 62 | 53 | 70 |
| Flexural modulus (MPa) | 1980 | 2000 | 1700 | 2500 |
| Impact resistance (J/m) (Notched Izod) | 50 | 60 | 65 | 25 |
| Heat deformation temp.(° C.) | 50 | 47 | 50 | 57 |
| Color tone of three-dimensional structure | Cloudy | Cloudy | Cloudy | Pale yellow & transparent |
| Appearance of three-dimensional structure | Good | Good | Good | Good |
| Section of three-dimensional structure | FIG. 2 | — | — | FIG. 3 |
| Presence of islands | Yes | Yes | Yes | No |
| Particle diameter of islands | 20 to 50 | 20 to 50 | 50 to 100 | — |

[1]Type of polymer for islands
A: polytetramethylene glycol (number-average molecular weight 2000)
B: polyether "PTG-L" manufactured by HODOGAYA CHEMICAL Co., Ltd.) (polyether copolymer comprising an oxytetramethylene unit and a side chain-containing oxytetramethylene unit bonded together at random, the side chain-containing oxytetramethylene unit having a branched structure represented by the formula: —$CH_2CH_2CH(CH_3)CH_2O$—)
[2]Content (% by mass) based on the mass of the photo curable resin composition.

As the above Table 1 shows, the three-dimensional objects (objects be stereolithography) obtained in EXAMPLES 1 to 3 have cured resin layers being made of the actinic radiation-curable resin composition and having a sea-island microstructure wherein fine island components which are made of a polymer (a polyalkylene ether compound) differing from a cured resin constituting the sea component and have a particle diameter of 20 to 2,000 nm are dispersed in the sea component made of the cured polymer. Owing to this sea-island microstructure, these three-dimensional objects have largely improved impact strength compared with the three-dimensional object (object by stereolithography) having no such sea-island microstructure obtained in COMPARATIVE EXAMPLE 1, as well as other physical properties such as tensile strength comparable thereto.

While the present invention has been described above in detail by referring specific embodiments thereof, it is obvious for those skilled in the art that various changes and modifications can be made without departing from the spirit and scope of the invention.

The present application is based on Japanese Patent Application filed on Jun. 24, 2003 (Japanese Patent Application 2003-179034), the contents of which is incorporated by reference.

INDUSTRIAL APPLICABILITY

The three-dimensional object according to the present invention is not restricted in the overall shape, dimension, intended use and so on thereof. Typical examples of use of the three-dimensional object according to the present invention include products for practical use such as a model for examining the appearance mode in the course of design, a model for checking the function of a part, a matrix die for structuring a template, a base model for structuring a metallic die, a part having a complicated microstructure, a three-dimensional part having a complicated structure and so on, though the present invention is not restricted thereto. The three-dimensional object according to the present invention is particularly suitable for products for practical use such as a model of a delicate part with a need for a high impact resistance, a part having a complicated microstructure and a three-dimensional part having a complicated structure. More specifically speaking, it is effectively usable as, for example, models of delicate parts, electric and electronic parts, furniture, architectural structures, automobile parts, various containers, template and so on, matrices, processing members and parts thereof for practical use in some cases.

The invention claimed is:

1. A three-dimensional object comprising a plurality of cured resin layers accumulated to each other, each of the cured resin layers having a shaped pattern formed by irradiating a molding surface of an actinic radiation-curable resin composition with an actinic radiation,
wherein the three-dimensional object comprises at least one cured resin layer comprising a sea-island microstructure in which island components are dispersed in a sea component comprising a cured polymer, the island components comprise a polymer differing from the cured resin constituting the sea component, the island components are fine island components having a particle diameter of 20 to 2,000 nm, and the polymer constituting the island components is a polyalkylene ether compound having a number average molecular weight of 500 to 10,000.

2. The three-dimensional object as claimed in claim 1, wherein all of the plurality of cured resin layers constituting the three-dimensional object have the sea-island microstructure in which island components are dispersed in a sea component comprising a cured polymer, the island components comprise a polymer differing from the cured resin constituting the sea component, and the island components are fine island components having a particle diameter of 20 to 2,000 nm.

3. The three-dimensional object as claimed in claim 1, wherein each of the cured resin layers constituting the three-dimensional object has a thickness of 10 to 500 μm.

4. The three-dimensional object as claimed in claim 1, wherein each of the cured resin layers having the sea-island microstructure has a sum of the island components of 1 to 30% by mass with respect to the mass of the each of the cured resin layers.

5. The three-dimensional object as claimed in claim 1, wherein the polymer constituting the island components has a glass transition temperature of lower than 40° C.

6. The three-dimensional object as claimed in claim 1, wherein the sea component comprises the cured resin formed by using at least one actinic radiation-polymerizable compound selected from the group consisting of a cationic-polymerizable organic compound capable of undergoing cationic polymerization upon irradiation with an actinic radiation and a radical-polymerizable organic compound capable of undergoing radical polymerization upon irradiation with an actinic radiation.

7. The three-dimensional object as claimed in claim 1, wherein the sea component comprises the cured resin formed by using both of a cation-polymerizable organic compound and a radical-polymerizable organic compound.

8. The three-dimensional object as claimed in claim 6, wherein the cation-polymerizable organic compound is a compound having an epoxy group, and the radical-polymerizable organic compound is a compound having a (meth) acryl group.

9. A three-dimensional object comprising a plurality of cured resin layers accumulated to each other, each of the cured resin layers having a shaped pattern formed by irradiating a molding surface of an actinic radiation-curable resin composition with an actinic radiation,
wherein the three-dimensional object comprises at least one cured resin layer comprising a sea-island microstructure in which island components are dispersed in a sea component comprising a cured polymer, the island components comprise a polymer differing from the cured resin constituting the sea component, the island components are fine island components having a particle diameter of 20 to 2,000 nm,
and wherein the island components in each of the cured resin layers having the sea-island microstructure do not exist in an upper portion of each of the cured resin layers, the upper portion being located in an actinic radiation-irradiated surface of each of the cured resin layers, but do exist in a portion extending from a bottom part of each of the cured resin layers to an upward part along the thickness of each of the cured resin layers.

10. The three-dimensional object as claimed in claim 9, wherein the upper portion containing no island component has a thickness of 2 to 10% with respect to the thickness of the each of the cured resin layers.

11. The three-dimensional object as claimed in claim 9, wherein each of the cured resin layers having the sea-island microstructure has a sum of the island components of 1 to 30% by mass with respect to the mass of the each of the cured resin layers.

12. The three-dimensional object as claimed in claim 9, wherein the polymer constituting the island components is a polyalkylene ether compound having a number average molecular weight of 500 to 10,000.

13. The three-dimensional object as claimed in claim 9, wherein the sea component comprises the cured resin formed by using both of a cation-polymerizable organic compound and a radical-polymerizable organic compound.

14. A method of producing a three-dimensional object having a sea-island microstructure as claimed in claim 1, which comprises:

irradiating a molding surface of an actinic radiation-curable resin composition with an actinic radiation to form a cured resin layer having a shape pattern; and repeating a fabricating procedure comprising: providing an actinic radiation-curable resin composition for one layer on a cured resin layer to form a molding surface; and irradiating the molding surface with an actinic radiation to form a cured resin layer having a shape pattern, so as to produce the thee-dimensional object comprising a plurality of cured resin layers accumulated, wherein the fabricating procedure is performed by using an actinic radiation-curable resin composition comprising a homogeneous mixture of a) at least one actinic radiation-polymerizable compound as the cured resin of the sea component, selected from the group consisting of a cationic-polymerizable organic compound capable of undergoing cationic polymerization upon irradiation with an actinic radiation and a radical-polymerizable organic compound capable of undergoing radical polymerization upon irradiation with an actinic radiation with b) a polyalkylene ether compound having a number-average molecular weight of 500 to 10,000 as the polymer to become polymeric island components, wherein the polymeric island components have a particle diameter of 20 to 2,000 nm upon irradiation.

15. The method as claimed in claim 14, wherein the cationic polymerizable organic compound is a compound having an epoxy group, and the radical polymerizable organic compound is a compound having a (meth)acryl group.

16. The method as claimed in claim 14, wherein a content of the polymer to become the polymeric island components is from 1 to 30% by mass with respect to the mass of the actinic radiation-curable resin composition used for forming the cured resin layer having the sea-island microstructure.

17. The method as claimed in claim 14, wherein the actinic radiation-curable resin composition comprises an oxetane compound together with a cationic-polymerizable organic compound having an epoxy group.

* * * * *